(12) United States Patent
Wirnitzer et al.

(10) Patent No.: US 10,777,944 B2
(45) Date of Patent: Sep. 15, 2020

(54) PLUG HOUSING FOR A SENSOR DEVICE AND PLUG MODULE

(71) Applicant: Robert Bosch GmbH, Stuttgart (DE)

(72) Inventors: Andreas Wirnitzer, Beilstein (DE); Roland Seitz, Nehren (DE); Timo Lindemann, Reutlingen (DE); Wolfgang Woernle, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/509,223

(22) PCT Filed: Jul. 24, 2015

(86) PCT No.: PCT/EP2015/066956
§ 371 (c)(1),
(2) Date: Mar. 7, 2017

(87) PCT Pub. No.: WO2016/045821
PCT Pub. Date: Mar. 31, 2016

(65) Prior Publication Data
US 2017/0288346 A1 Oct. 5, 2017

(30) Foreign Application Priority Data
Sep. 22, 2014 (DE) .................. 10 2014 219 030

(51) Int. Cl.
*H01R 13/66* (2006.01)
*G01L 19/14* (2006.01)
(Continued)

(52) U.S. Cl.
CPC ........... *H01R 13/6683* (2013.01); *G01K 1/08* (2013.01); *G01K 7/22* (2013.01); *G01L 19/14* (2013.01);
(Continued)

(58) Field of Classification Search
CPC H01R 13/6683; H01R 13/665; H01R 12/714; H01R 13/506; G01K 1/08; G01K 7/22; G01L 19/14; G01L 19/144
(Continued)

(56) References Cited

U.S. PATENT DOCUMENTS 5,460,545 A * 10/1995 Siemon .............. H01R 13/6589
439/404
5,647,757 A * 7/1997 Chrysostomou ... H01R 13/6271
439/188
(Continued)

FOREIGN PATENT DOCUMENTS

CN 103125051 B 3/2016
DE 102004003180 A1 8/2005
(Continued)

OTHER PUBLICATIONS

International Search Report dated Sep. 25, 2015 for International Patent Application No. PCT/EP2015/066956 fied on Jul. 24, 2015.

*Primary Examiner* — Marrit Eyassu
(74) *Attorney, Agent, or Firm* — Norton Rose Fulbright US LLP; Gerard Messina

(57) ABSTRACT

A plug module includes a sensor device and a plug housing, the plug housing including a socket, an inner side of which includes a receptacle area for accommodating the sensor device, and a cover that is connected to the socket with the aid of a fastening device, where a plurality of electrically conductive straight contact pins are introduced into the cover in such a way that (a) particular first ends of the contact pins protrude into an internal volume of the plug housing and are situated above the receptacle area of the socket, and (b) particular second ends of the contact pins are situated in the area of a connector of the cover.

7 Claims, 2 Drawing Sheets

(51) Int. Cl.
  *H01R 13/506* (2006.01)
  *G01K 1/08* (2006.01)
  *G01K 7/22* (2006.01)
  *H01R 12/71* (2011.01)

(52) U.S. Cl.
  CPC .......... *G01L 19/144* (2013.01); *H01R 13/506* (2013.01); *H01R 13/665* (2013.01); *H01R 12/714* (2013.01)

(58) Field of Classification Search
  USPC .......................................................... 73/700
  See application file for complete search history.

(56) References Cited

U.S. PATENT DOCUMENTS

| | | | | |
|---|---|---|---|---|
| 5,834,638 | A * | 11/1998 | Taylor | F02D 41/28 73/114.43 |
| 6,123,585 | A * | 9/2000 | Hussong | H05K 7/1472 439/652 |
| 6,131,467 | A * | 10/2000 | Miyano | G01L 19/0084 73/756 |
| 6,220,890 | B1 * | 4/2001 | Turek | H01R 4/242 439/404 |
| 6,272,913 | B1 * | 8/2001 | Naegele | G01K 13/02 374/E13.006 |
| 6,510,740 | B1 * | 1/2003 | Behm | G01D 1/00 73/708 |
| 7,043,993 | B2 * | 5/2006 | Hayashi | G01K 7/22 374/E7.028 |
| 9,470,595 | B2 * | 10/2016 | Ramsay | G01L 19/0069 |
| 2001/0018294 | A1 | 8/2001 | Kameyama | |
| 2002/0137397 | A1 * | 9/2002 | Little | H01R 13/501 439/686 |
| 2003/0151126 | A1 * | 8/2003 | Scheurich | G01L 19/003 257/682 |
| 2005/0092422 | A1 | 5/2005 | Oonishi | |
| 2007/0186659 | A1 * | 8/2007 | Engelhardt | G01D 11/245 73/708 |
| 2008/0216580 | A1 | 9/2008 | Kuznia et al. | |
| 2009/0282947 | A1 * | 11/2009 | Powell | G01D 5/34707 74/813 C |
| 2011/0138924 | A1 * | 6/2011 | Colombo | G01L 19/0092 73/756 |
| 2012/0161362 | A1 * | 6/2012 | Ludwig | H01L 21/565 264/272.14 |
| 2012/0270450 | A1 * | 10/2012 | Leonhard | H01R 13/443 439/680 |
| 2013/0065456 | A1 * | 3/2013 | Starke | H01R 29/00 439/701 |

FOREIGN PATENT DOCUMENTS

| | | |
|---|---|---|
| DE | 102004062466 A1 | 9/2005 |
| DE | 602005001715 T2 | 12/2007 |
| DE | 102006030849 A1 | 1/2008 |
| DE | 102008003848 A1 | 7/2009 |
| DE | 102010020119 A1 | 11/2011 |
| DE | 102012223014 A1 | 6/2014 |
| DE | 102013208534 A1 | 7/2014 |
| DE | 102013208537 A1 | 7/2014 |
| EP | 1096241 A1 | 5/2001 |
| EP | 1096242 A2 | 5/2001 |
| JP | S56100333 A | 8/1981 |
| JP | 2006023309 A | 1/2006 |
| JP | 2006292391 A | 10/2006 |
| WO | 2009121426 A2 | 10/2009 |
| WO | 2009153737 A1 | 12/2009 |

* cited by examiner

PLUG HOUSING FOR A SENSOR DEVICE AND PLUG MODULE

CROSS-REFERENCE TO RELATED APPLICATIONS

The present application is the national stage of International Pat. App. No. PCT/EP2015/066956 filed Jul. 24, 2015, and claims priority under 35 U.S.C. § 119 to DE 10 2014 219 030.4, filed in the Federal Republic of Germany on Sep. 22, 2014.

FIELD OF THE INVENTION

The present invention relates to a plug housing for a sensor device and a plug module.

BACKGROUND

Present-day pressure sensors, which are installed in an intake tract of an internal combustion engine, are distance encoder sensors in a 2nd level housing including an analog or digital interface. The sensors are typically made up of a pressure sensor module, usually of a premold housing, which is more or less complexly soldered or welded into the 2nd level housing. The necessary passive components such as backup capacitors are either adhesively bonded to the premold module or installed in the 2nd level housing.

In addition, an NTC sensor is installed for the temperature measurement. In the analog variant, it is routed directly to the outside via the plug. In the digital variant, the NTC sensor is connected to an application-specific integrated circuit for the purpose of evaluation.

To ensure media resistance, all exposed electrical contacts, such as premold, NTC and capacitors are provided with a suitable sealant in order to prevent corrosion. In order to satisfy the media requirements of the pressure sensor applications, the sensor element, the application-specific integrated circuit for evaluation and the wire bonds in the pressure sensor module are typically protected by a sealant neutralizing the corrosive medium.

The connection of the different components in the housing in combination with the different plugs usually necessitates complex inserts in the plastic housing parts. Different customer requirements with regard to plug or socket geometries have the result that these comparatively expensive housing parts have to be manufactured for each variant in a costly manner.

DE 10 2012 223 014 A1 describes a device for detecting the pressure and the temperature of a medium. The device includes a temperature sensor and a pressure sensor situated in a shared housing, the housing further including a measuring space. The measuring space is connected to a space accommodating the medium via a pressure connection, the pressure sensor being situated in the measuring space. Furthermore, the temperature sensor includes connecting lines.

Appropriate terminal contacts are provided in the housing for contacting the connecting lines of the temperature sensor. Furthermore, to accommodate the temperature sensor, at least one conical bushing which opens into the pressure connection is situated in the housing, the conical bushing widening in the direction of the pressure connection. It is likewise provided that a sealant enclosing the connecting lines of the temperature sensor is introduced into the conical bushing, at least in sections.

SUMMARY

The present invention provides a plug housing for a sensor device including a socket, which includes a receptacle area on an inner side for accommodating the sensor device, and a cover which is connected to the socket with the aid of a fastening device, a plurality of electrically conductive straight contact pins being introduced into the cover in such a way that particular first ends of the contact pins protrude into an internal volume of the plug housing and are situated above the receptacle area of the socket, and particular second ends of the contact pins are situated in the area of a connector of the cover.

The present invention further provides a plug module including the plug housing according to the present invention and a sensor device, which is situated in the receptacle area of the socket, the plurality of straight contact pins situated in parallel to one another, contacting particular electrical contacts of the sensor device.

One idea of the present invention is to implement a pressure sensor having direct contacting on the sensor module, while using a plurality of cost-reducing elements. The use of simple, straight contact pins, which are later introduced into the housing cover, makes it possible to avoid complex inserts. This reduces the costs of the plug housing significantly. Moreover, it is significantly simpler to manufacture the plug housing without inserts.

The present invention also makes it possible to contact a sensor device using a plurality of contact pins by simple cold contacting, without the system being mechanically overdetermined. This ensures a very simple final assembly.

The present invention makes it possible to represent both cover and socket variants in a simpler manner, since both housing parts may be used and combined multiple times. The variant management is consequently simplified significantly. The electrically conductive straight contact pins make a reliable electrical contacting of the sensor device possible.

Advantageous embodiments and refinements of the present invention are discussed in the following description with reference to the drawings.

It is preferably provided that the plurality of contact pins is injected into the cover, is situated in a predetermined lateral spacing parallel to one another and includes at least three contact pins. The plurality of contact pins makes it possible to achieve reliable electrical contacting of multiple contacts or contact surfaces of the sensor device.

Preferably, it is further provided that the plurality of contact pins is elastic. Consequently, a contacting of the electrical contacts of the sensor device may be made possible by pressing the plurality of contact pins onto the electrical contacts of the sensor device. The intrinsic resilience of the contact pins compensates for the tolerance of the contact pins. The resilience of the straight contact pins thus renders additional spring elements on the sensor device or in the plug housing unnecessary. The principle makes it possible to use an established, cost-effective sensor device. This yields the advantage of the possibility of integrating all passive components. In this case, no further passive components are to be considered in the 2nd level housing. Furthermore, a compact design of the plug housing may be made possible while simultaneously ensuring great benefits. Moreover, the application-specific integrated circuit may also be extrusion coated. Consequently, no additional media protection of the application-specific integrated circuit is necessary.

Preferably, it is further provided that the fastening device is formed as a locking device or clamping device. Consequently, a simple and reliable attachment of the cover to the socket of the plug housing is made possible.

According to another preferred exemplary embodiment, it is provided that the locking device has elastic latching tabs situated on the cover, which engage with assigned detents situated on the socket. Thus a reliable connection between the cover and the socket of the plug housing may be provided.

Preferably, it is further provided that the elastic latching tabs are situated on a circumferential edge formed on a side of the cover facing the socket. The placement of the latching tabs on the circumferential edge of the cover makes it possible to ensure a secure and reliable attachment of the cover on the socket.

Preferably, it is further provided that the plurality of contact pins is introduced into the cover in such a way that these pins are pressed onto the particular electrical contacts of the sensor device. Consequently, a reliable electrical contacting of the plurality of contact pins to the particular contacts of the sensor device may be made possible.

According to another preferred exemplary embodiment, it is provided that a plug connectable to the connector is electrically connected to the sensor device via the plurality of electrically conductive contact pins and their particularly assigned electrical contacts. It is consequently possible to achieve a simple and secure electrical connection of the plug to the sensor device and simultaneously a compact design of the plug module.

According to another preferred embodiment, it is provided that the sensor device is designed for measuring a pressure, is adhesively bonded to the socket in a pressure-resistant and air-tight manner, and a pressure feed of the sensor device is situated on an underside of the sensor device adjacent to the socket. The sealing adhesive bond advantageously results in the media separation between the pressure feed and the housing interior.

It is preferably further provided that a temperature sensor is connected to the sensor device, the temperature sensor being formed by a thermistor. A separately manufactured thermistor module makes it possible to integrate the temperature sensor into the 2nd level housing very simply. Consequently, no additional contacting or sealing is necessary.

According to another preferred specific embodiment, it is provided that the temperature sensor is extrusion coated with plastic, installed in the socket and hot-caulked, the temperature sensor including a plurality of electrically conductive contact bows, which contact particular electrical contacts of the sensor device. Consequently, the temperature sensor extrusion coated with plastic to form a temperature sensor module may be inserted into the socket or attached in it in a simple manner.

The described embodiments and refinements may be arbitrarily combined with one another.

Additional possible embodiments, refinements and implementations of the present invention also include non-explicitly named combinations of features of the present invention, which were previously described or are described in the following with regard to the exemplary embodiments.

The appended drawings are intended to convey a further understanding of the specific embodiments of the present invention. They illustrate specific example embodiments and are used in conjunction with the description for explaining principles and concepts of the present invention. Identical reference numerals in the figures of the drawings denote elements, components or assemblies which are identical or have an identical function, provided nothing to the contrary is indicated.

Other specific embodiments and many of the above-named advantages result with respect to the drawings. The elements depicted in the drawings are not necessarily shown true to scale in relation to one another.

DETAILED DESCRIPTION

Figure 1:
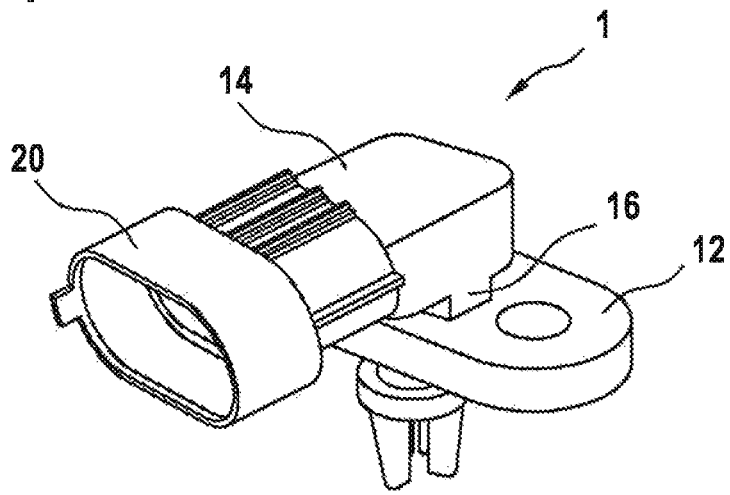
FIG. 1 shows a perspective view of a plug housing according to an example embodiment of the present invention.

FIG. 1 shows a perspective view of a plug housing according to an example embodiment of the present invention. Plug housing 1 for sensor device 10 includes a socket 12 and a cover 14, which is connected to the socket 12 with the aid of a fastening device 16. Cover 14 also includes a connector 20 for connecting a plug. Fastening device 16 is preferably formed as a locking device. Alternatively, fastening device 16 may also be formed, for example, as a clamping device.

A plug connectable to connector 20 is electrically connected to sensor device 10 via a plurality of electrically conductive contact pins 18 (not shown in FIG. 1) and their particularly assigned electrical contacts 10a.

Figure 2:
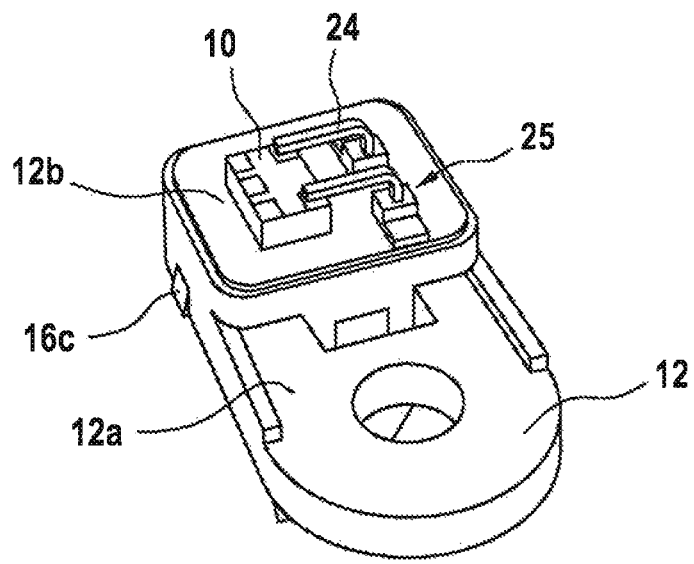
FIG. 2 shows a perspective view of the plug housing including an installed sensor device and a connected temperature sensor according to the example embodiment of the present invention.

FIG. 2 shows a perspective view of the plug housing including an installed sensor device and a connected temperature sensor according to an example embodiment of the present invention. Socket 12 has a receptacle area 12b on an inner side 12a for accommodating sensor device 10. Sensor device 10 is preferably adhesively bonded to socket 12 in receptacle area 12b. Alternatively, sensor device 10 may also be attached to socket 12 in another suitable manner.

Furthermore, a detent 16c of fastening device 16 is shown in the area of one side wall of socket 12. In the present exemplary embodiment, fastening device 16 includes elastic latching tabs 16a (not shown in FIG. 2) situated on cover 14, which engage with assigned detents 16c situated on socket 12. Furthermore, temperature sensor module 25 is inserted into socket 12. Temperature sensor module 25 includes a temperature sensor 22 (not shown in FIG. 2). Sensor device 10 is contacted by temperature sensor 22 via a pair of electrically conductive contact bows 24 which are integrated into temperature sensor module 25.

Sensor device 10 is designed for measuring a pressure, is adhesively bonded to socket 12 in a pressure-resistant and air-tight manner, and a pressure feed of sensor device 10 is preferably situated on an underside of sensor device 10 adjacent to socket 12.

Figure 3:
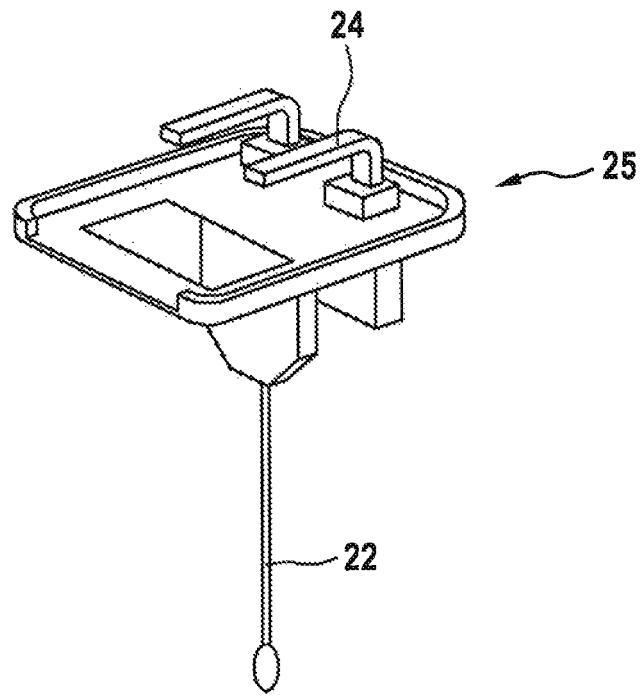
FIG. 3 shows a perspective view of a temperature sensor module of the plug housing according to the example embodiment of the present invention.

FIG. 3 shows a perspective view of a temperature sensor module of the plug housing according to an example embodiment of the present invention. Temperature sensor module 25 includes temperature sensor 22, which is preferably designed as a thermistor or NTC thermistor.

Temperature sensor 22 is extrusion coated with plastic. Temperature sensor module 25 also has contact bows 24 for the contacting of sensor device 10. Temperature sensor module 25 may thus be inserted into socket 12 and fastened by hot caulking.

The medium separation necessary for the passage of temperature sensor 22 through socket 12 preferably takes place via a tight extrusion coating of the contacts of temperature sensor 22 in the temperature sensor module and the adhesive bonding of the temperature sensor module into socket 12. Alternatively, the direct connection of temperature sensor 22 on a rear side of temperature sensor module 25 is possible. In this case, temperature sensor 22 is inserted into socket 12 from above, and subsequent contacting onto the particular contacts of sensor device 10 takes place without previous extrusion coating of the temperature sensor. The contacting of the contacts of sensor device 10 by temperature sensor 22 is preferably carried out by soldering. Alternatively, the contacting may also be carried out by welding or by conductive adhesive.

Figure 4:
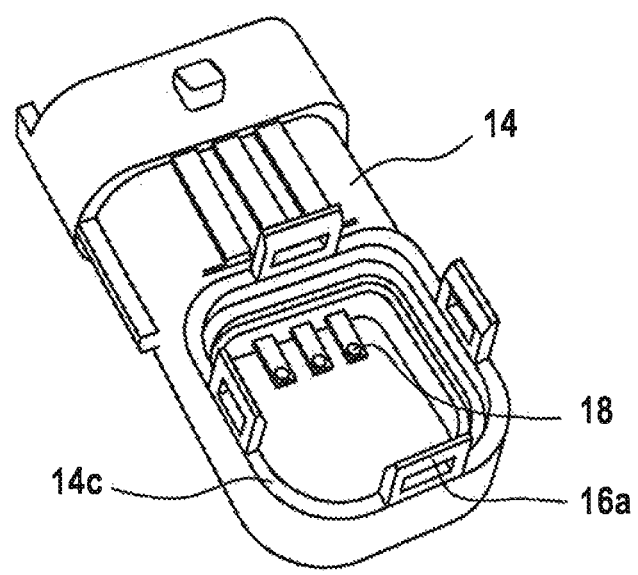
FIG. 4 shows a perspective view of a cover of the plug housing according to the example embodiment of the present invention.

FIG. 4 shows a perspective view of a cover of the plug housing according to an example embodiment of the present invention. According to the present specific example embodiment, cover 14 includes three contact pins 18, which are injected into cover 14, are situated in a predetermined lateral distance in parallel to one another and are elastic. The locking device situated on cover 14 has a plurality of elastic latching tabs 16a, which are situated on a circumferential edge 14c formed on a side of cover 14 facing socket 12.

Although the present invention was described above based on preferred exemplary embodiments, it is not limited thereto, but instead may be modified in a variety of ways. In particular, the present invention may be diversely changed or modified without departing from the core of the present invention.

According to the preferred specific embodiments of the present invention, a digital variant of the sensor device was described in the form of a pressure sensor. Alternatively, an analog variant of sensor device 10 may also be provided. For implementing the analog pressure sensor variant the analog NTC signal is, for example, routed directly outwards onto the plug. This electrical connection of the NTC signal may be implemented either via a pad designed for this purpose on a contacting side of sensor device 10, which makes contact with the plug pin or contact pin possible, or a direct connection of the NTC contact on the plug pin by, for example, welding, soldering, an insulation displacement connection or conductive adhesive.

What is claimed is:

1. A plug module, comprising:
   a plug housing, including:
     a socket having an inner side which includes a receptacle area located above and in a different plane than the inner side;
     a sensor device situated in the receptacle area of the socket; and
     a cover connected to the socket with a fastening device;
   wherein the fastening device is a locking device that includes elastic latching tabs, situated on a circumferential edge formed on a side of the cover facing the socket, and corresponding detents that are situated on an area of a side wall of the socket and with which the respective elastic latching tabs engage,
   wherein a plurality of electrically conductive and elastic straight contact pins are situated at a predetermined lateral distance from each other, are pressed onto and directly contact particular electrical contact surfaces of the sensor device, and are arranged in the cover so that particular first ends of the contact pins protrude into an internal volume of the plug housing and are situated above the receptacle area of the socket, and so that particular second ends of the contact pins are situated in an area of a connector of the cover,
   wherein an axis along a longest connector dimension of the connector and through an opening of the connector and extending through the cover is oriented perpendicularly with respect to an axis along a longest socket dimension of the socket, and wherein the cover and the connector only cover a portion of the inner side of the socket, wherein the longest connector dimension and the longest socket dimension are perpendicular to one another,
   wherein a temperature sensor is received by the socket, and wherein the temperature sensor includes plurality of electrically conductive contact bows that contact corresponding ones of the electrical contact surfaces of the sensor device, and
   wherein the plurality of electrically conductive and elastic straight contact pins are injected into the cover and are elastic.

2. The plug module of claim 1, wherein the plurality of electrically conductive contact pins are configured to electrically connect, to the sensor device and via their respectively corresponding electrical contact surfaces, a plug that is connectable to the connector.

3. The plug module of claim 2, wherein the sensor device is configured for measuring a pressure and is adhesively bonded to the socket in a pressure-resistant and air-tight manner, and a pressure feed of the sensor device is situated on an underside of the sensor device adjacent to the socket.

4. The plug module of claim 3, wherein the temperature sensor is connected to the sensor device, is formed by a thermistor, is extrusion coated with plastic, is installed in the socket and hot-caulked.

5. The plug module of claim 2, wherein the temperature sensor is connected to the sensor device, is formed by a thermistor, is extrusion coated with plastic, is installed in the socket and hot-caulked.

6. The plug module of claim 1, wherein the sensor device is configured for measuring a pressure and is adhesively bonded to the socket in a pressure-resistant and air-tight manner, and a pressure feed of the sensor device is situated on an underside of the sensor device adjacent to the socket.

7. The plug module of claim 1, wherein the temperature sensor is connected to the sensor device, is formed by a thermistor, is extrusion coated with plastic, is installed in the socket and hot-caulked.

* * * * *